United States Patent [19]

Macdonald et al.

[11] Patent Number: 4,867,290

[45] Date of Patent: Sep. 19, 1989

[54] HIGH EXCURSION TORSIONAL VIBRATION DAMPER FOR CONTROLLED ENERGY ABSORPTION

[75] Inventors: Fraser J. Macdonald, Farmington Hills; Malcolm E. Kirkwood, Livonia, both of Mich.

[73] Assignee: Ford Motor Company, Dearborn, Mich.

[21] Appl. No.: 239,888

[22] Filed: Sep. 2, 1988

[51] Int. Cl.⁴ .............................................. F16D 33/00
[52] U.S. Cl. .................................. 192/3.28; 192/106.1; 192/106.2
[58] Field of Search ................. 192/3.28, 106.1, 106.2, 192/70.17

[56] References Cited

U.S. PATENT DOCUMENTS

| | | | |
|---|---|---|---|
| 3,628,353 | 12/1971 | Armstrong | 192/106.2 |
| 4,101,015 | 7/1978 | Radke | 192/106.2 |
| 4,138,003 | 2/1979 | Malloy | 192/106.2 |
| 4,437,551 | 3/1984 | Gimmler et al. | 192/3.28 |
| 4,588,058 | 5/1986 | Aliouate | 192/106.2 |

FOREIGN PATENT DOCUMENTS 4614761 12/1966 Japan ................................ 192/106.2

*Primary Examiner*—Leslie A. Braun
*Assistant Examiner*—Andrea Pitts
*Attorney, Agent, or Firm*—Donald J. Harrington; Keith L. Zerschling

[57] ABSTRACT

A long travel damper having variable friction lag comprising a torque input cover plate and a torque output driven plate, a plurality of springs arranged on a circular spring guide for cushioning torque delivery between the cover plate and the driven plate, the springs having a large L/D ratio, and a friction lag clutch adapted to be actuated by cam plates connected respectively to the cover plate and the driven plate whereby the clutch is applied with a variable force that depends upon relative angular displacement of the cam plates.

5 Claims, 11 Drawing Sheets

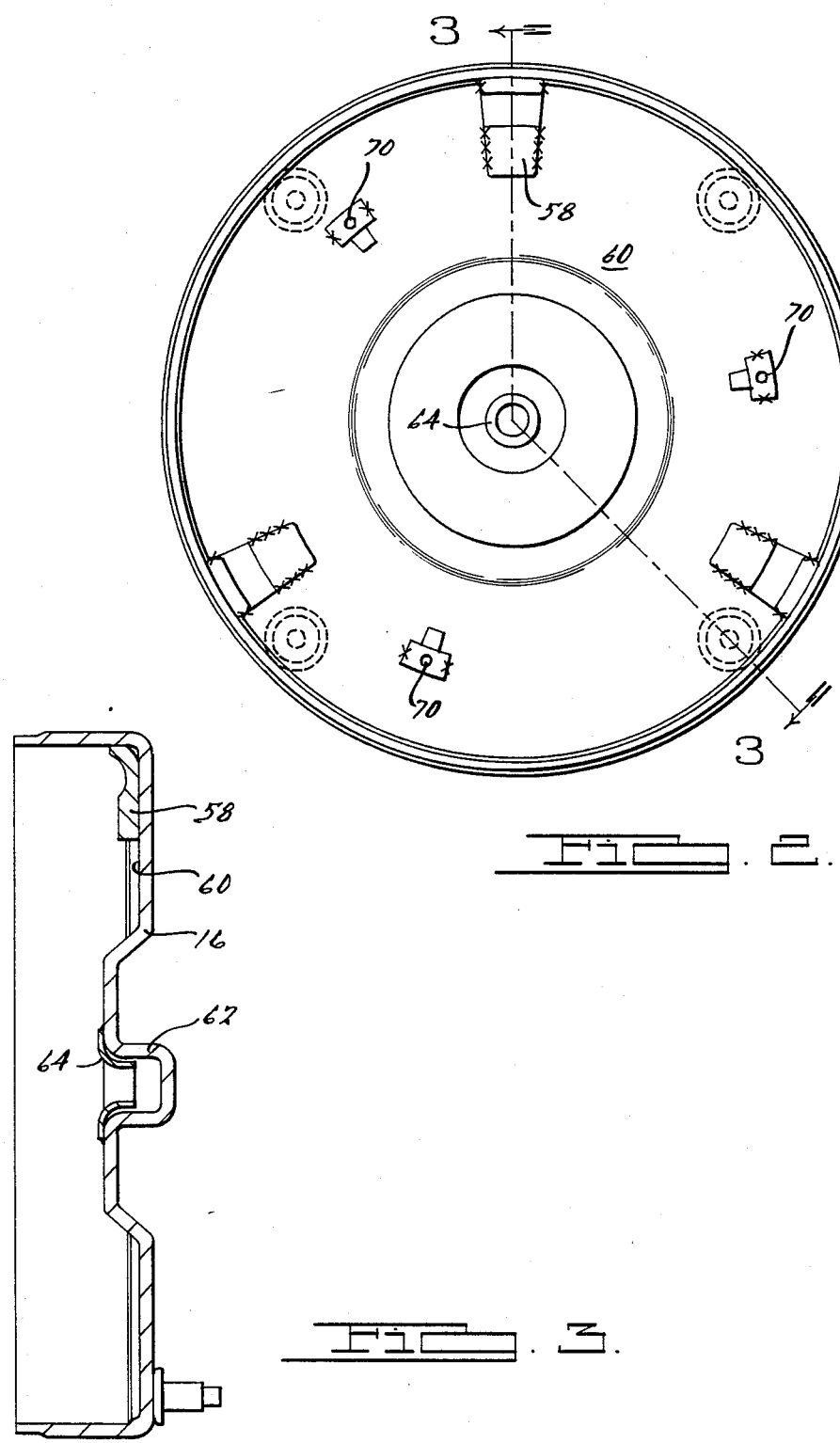

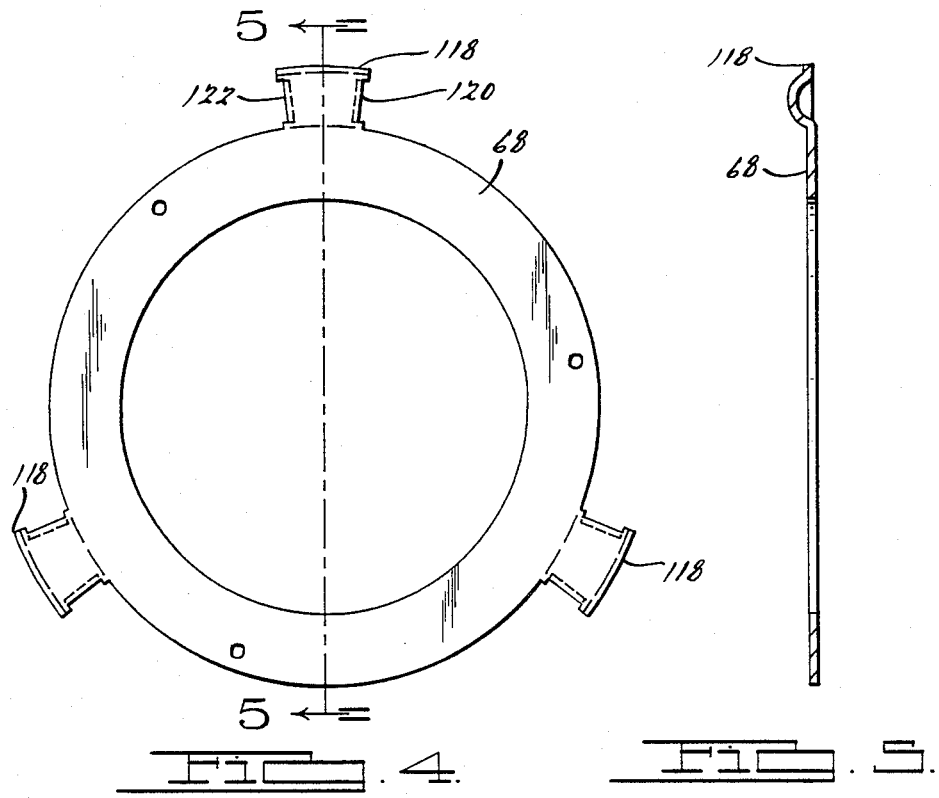
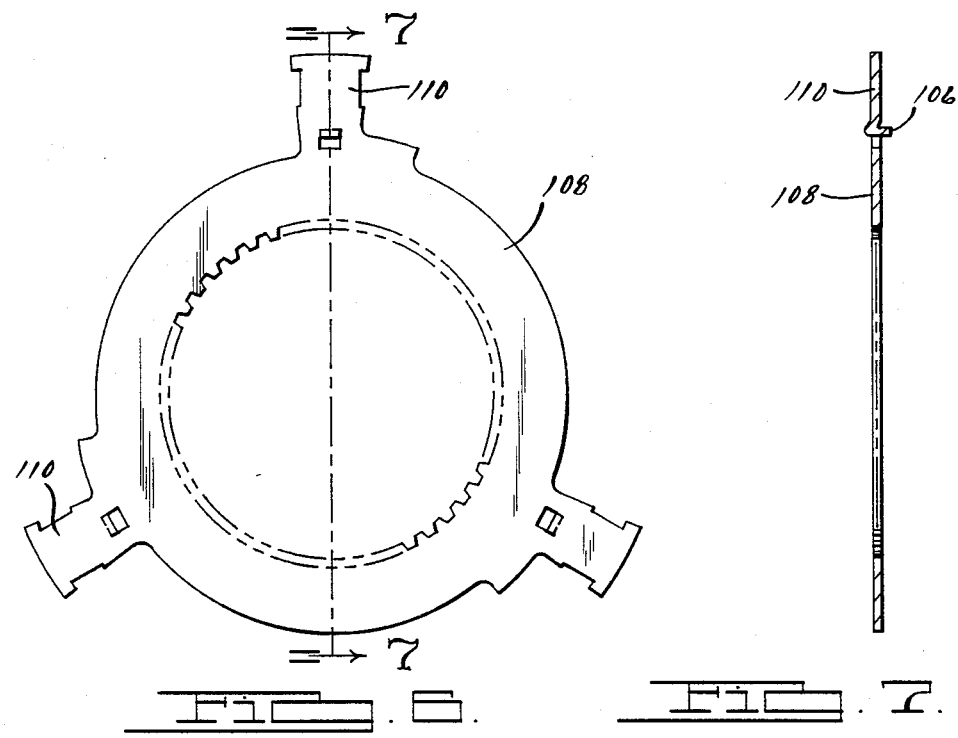

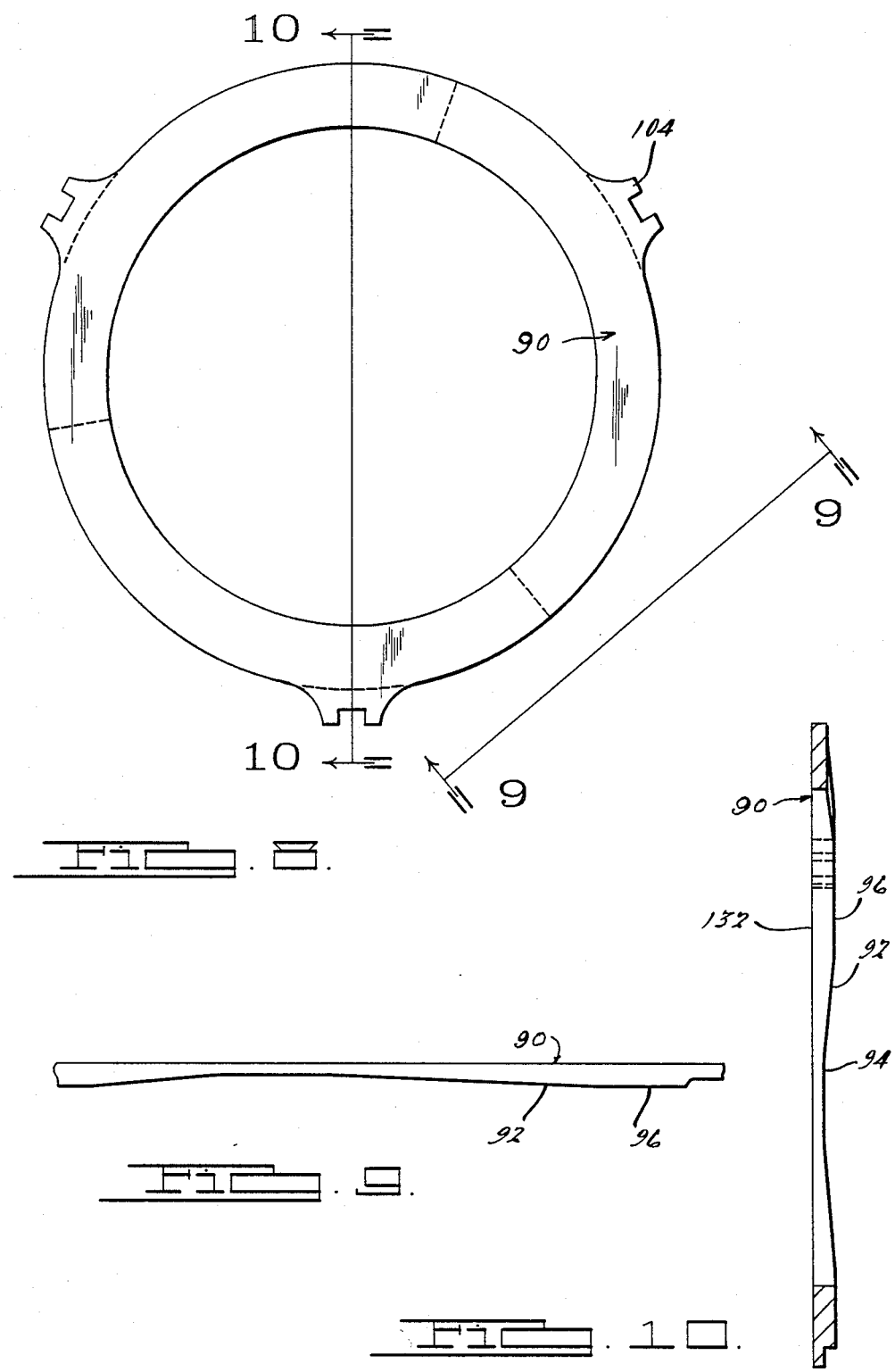

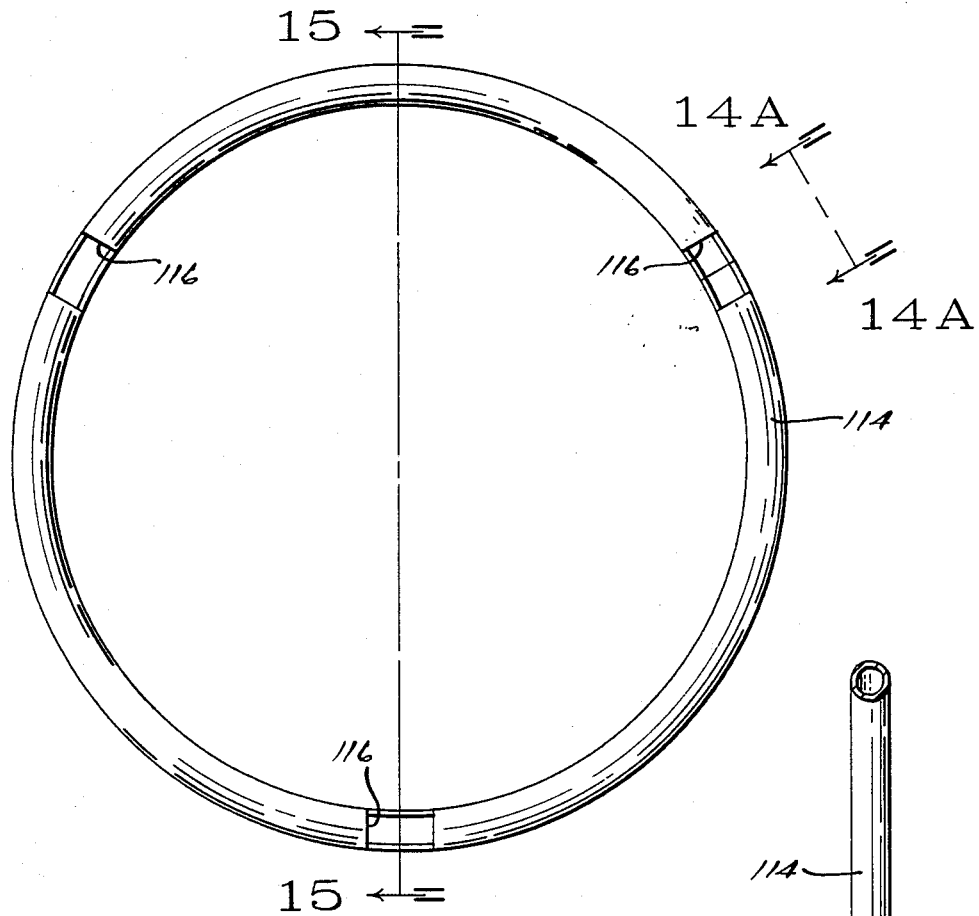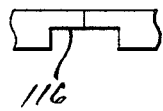
FIG. 14.
FIG. 14A.
FIG. 15.

HIGH EXCURSION TORSIONAL VIBRATION DAMPER FOR CONTROLLED ENERGY ABSORPTION

BACKGROUND OF THE INVENTION

Our invention comprises a high excursion or long travel damper for use in a split torque transmission or a lockup torque converter for a transmission of the kind shown in U.S. Pat. No. 4,509,389, which is assigned to the assignee of this invention. Our invention also may be applied, however, to automotive transmission concepts other than in the transmission arrangement shown in the '389 patent.

We are aware of long travel dampers for use in automotive vehicle drivelines having multiple ratio gearing and internal combustion engines wherein transient torque fluctuations during torque delivery from the engine to the torque input elements of the gearing are absorbed. An example of this is shown in Fall et al patent 4,304,107. Another example is shown in Lamarche patent 4,139,995.

The damper shown in the '107 patent comprises a driving member that may be connected to an impeller housing of the kind shown in the '389 patent. A driven disc is adapted to be connected to the turbine shaft of the converter shown in the '389 patent. The driving member and the driven disc of the damper are resiliently connected by two series of compression springs, one series being disposed in parallel relationship with respect to the other. So-called floating spacers are located between the springs in each series. The springs act as a cushion for absorbing torque fluctuations. In addition to the cushion effect, the damper of the '107 patent uses friction discs and disc actuating washer springs. The friction disc and the associated washer springs establish a friction lag in the spring system established by the series related springs as torque is transmitted from the converter impeller housing to the driven disc or turbine shaft of the torque converter.

The damper of the '995 patent is similar in concept to the damper of the '107 patent except that the spacers between the individual springs of each series are replaced by equalizer plates that are rotatably mounted in floating fashion on the hub of the converter turbine. Another example of a damper having both a spring cushion effect and a friction lag effect is described in U.S. Pat. No. 4,555,009.

BRIEF DESCRIPTION OF THE INVENTION

Our invention is an improvement over prior art dampers of the kind described above. It includes springs with a low spring rate to isolate the driving member with respect to the driven member in a lockup converter of the kind shown in the '389 patent. In addition it incorporates a variable friction lag rather than a constant lag which is characteristic of the prior art designs. This introduces flexibility in the design of the damper and makes it possible for it to tailor the characteristics of the damper to suit the torsional vibration damping requirements of the converter and transmission with which the damper is used.

Our improved design reduces the number of individual springs an eliminates the spacers and the so-called friction skates or friction elements shown, for example, in designs like that of the '107 patent. This makes it possible to increase the number of active spring coils and to increase the angular travel of the damper thereby increasing the damper energy storage capability.

Long springs having length to diameter ratios of 4 or greater are positioned and guided by an internal guide that is preformed to describe an arc generated by the driven member. Retainer pockets for the springs need not be provided since the guide retains the springs in assembled relationship.

It is possible with our improved damper to provide a variable friction lag system thus enabling a smooth transition from moderate lag used in torsional isolation stages to a much higher lag required to absorb the energy of transient torque fluctuations in a torque converter transmission driveline. As relative angular motion is induced between the driving member and the driven member, the variable friction lag is achieved by inneracting cam elements having registering cam faces, one cam element being connected to the driven member and the cooperating cam element or follower being connected to the driving member. The cam elements produce an axial displacement which compresses a Belleville spring, which in turn loads a friction plate with an axially directed force component to establish a friction force. Both engine induced torsional vibrations and transient torque fluctuations thus can be accommodated.

The presence of the cam elements makes it possible to vary the characteristics of the damper as required. The geometry of the cam surfaces can be designed so that the predetermined friction lag required for any particular installation may be obtained without major design changes and without affecting the assembly procedures during manufacture of the transmission.

BRIEF DESCRIPTION OF THE FIGURES OF THE DRAWINGS

FIG. 2 is an end view of one portion of the damper cover of the damper shown in FIG. 1.

FIG. 3 is a cross-sectional view as seen from the plane of section line 3—3 of FIG. 2.

FIG. 4 shows a retainer plate which forms a part of the cover assembly of the damper of FIG. 1.

FIG. 5 is a cross-sectional view as seen from the section line 5—5 of FIG. 4.

FIG. 6 shows a driven plate for the damper assembly in FIG. 1 which in turn is splined to the turbine shaft of the torque converter.

FIG. 7 is a cross-sectional view as seen from the plane of section line 7—7 of FIG. 6.

FIG. 8 shows a cam element used in the damper of FIG. 1.

FIG. 9 is an edge view of the cam element of FIG. 8 as viewed from the direction of the sectional plane 9—9 of FIG. 8.

FIG. 10 is a cross-sectional view of the cam element of FIG. 8 as seen from the plane of section line 10—10 of FIG. 8.

FIG. 14 is a plan view of the spring guide for the springs of the assembly of FIG. 1.

FIG. 14A is a partial edge view of the ring 114 of FIG. 14 as seen from the plane of section line 14A—14A of FIG. 14.

FIG. 15 is a full edge view of the spring guide of FIG. 14.

PARTICULAR DESCRIPTION OF THE INVENTION

Figure 1:
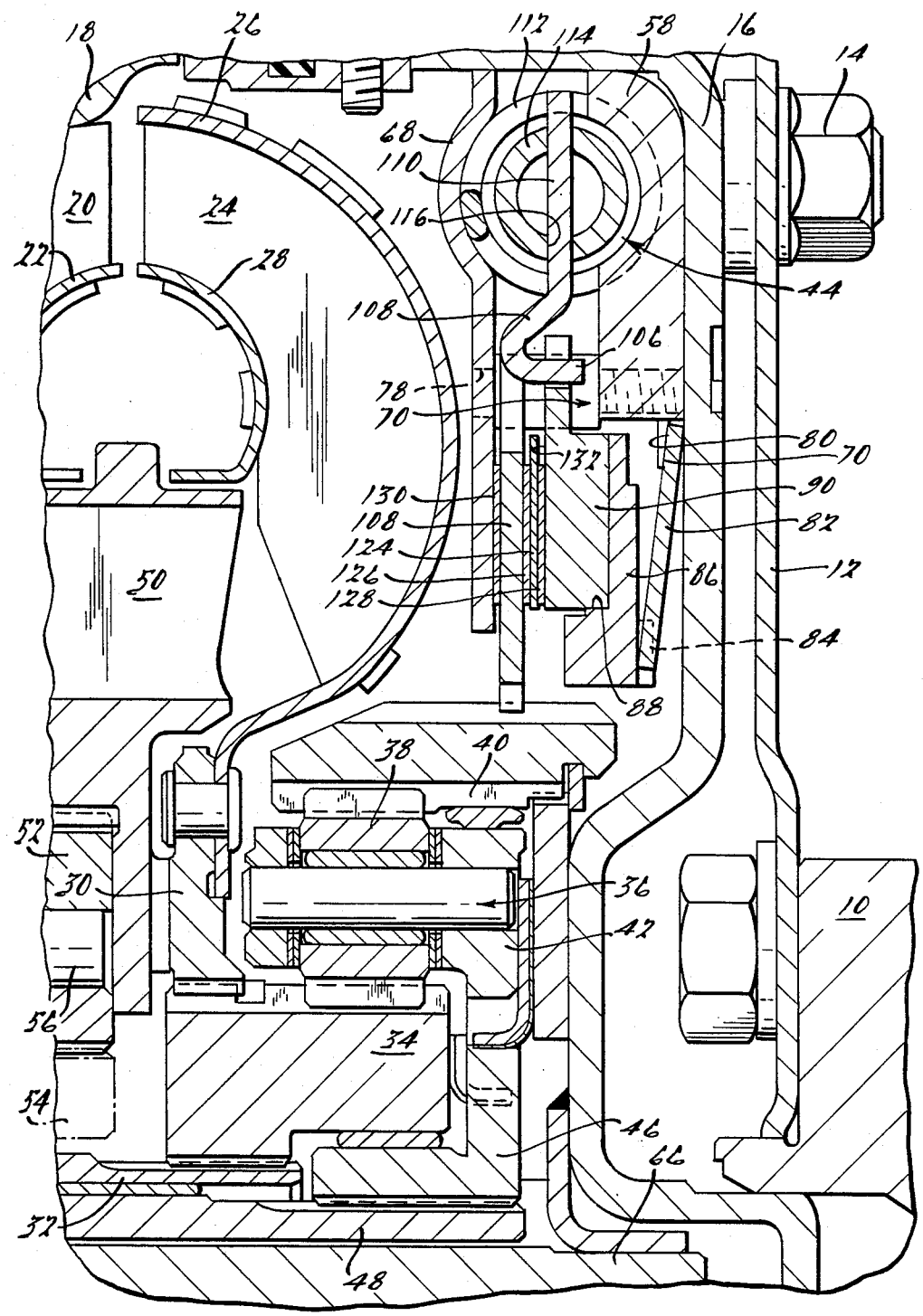
FIG. 1 shows a partial cross-sectional view of a hydrokinetic torque converter used in an automotive vehicle driveline.

We have shown in FIG. 1 a partial cross-sectional view of a torque converter and damper assembly for an automotive transmission. Reference may be made to U.S. Pat. No. 4,756,210 dated July 12, 1988, for a description of a transmission that is adapted to embody the damper and gearing arrangement shown in FIG. 1. That patent is assigned to the assignee of this invention and reference may be made to it for the purpose of complementing this disclosure.

In FIG. 1 an engine crankshaft is shown at 10. It is bolted, as shown, to a driveplate 12 which in turn is bolted or otherwise secured at 14 to the radially outward portion of a torque converter cover 16.

The cover is secured at its outer periphery to an impeller shell 18 which carries impeller blades 20. The blades 20, the shell 18 and an annular inner race 22 define a toroidal outflow passage for hydrokinetic fluid which registers with turbine inflow passages defined by turbine blades 24, an outer turbine shroud 26 and an inner turbine shroud 28.

The outer turbine shroud 26 has a hub which is riveted or otherwise secured to a turbine hub 30. Hub 30 is internally splined to a torque input sleeve shaft 32 for planetary gearing, not shown.

The turbine hub is connected directly also to sun gear 34 of a simple planetary split torque gear unit 36. The gear unit 36 includes pinions 38, a ring gear 40 and a carrier 42 that rotatably supports pinions 38. The carrier is connected to the converter housing 16.

A damper assembly 44 provides a resilient torque delivery connection between the converter housing 16 and the ring gear 40, thus providing a split torque delivery with a portion of the torque distributed hydrokinetically through the torque converter and the balance being distributed through the gear unit 36.

Carrier 42 is splined at its hub 46 to a second torque input shaft 48. Thus the torque transmitted through the damper and the torque converter is distributed to each of two input shafts 32 and 48.

The stator for the torque converter comprises a stator blade portion 50 located between the torus flow exit section of the turbine blades 24 and the flow inlet portion of the impeller blades 20. Stator blades 50 are supported by a stator hub 52 which is anchored to a stationary stator sleeve shaft 54 by means of an overruning brake 56. A damper cover identified by reference character 58 in FIG. 1 is shown in detail in FIGS. 2 and 3. As seen particularly in FIG. 3, the cover portion 58 is secured to the inner wall 60 of torque converter cover 16. Its hub includes a bearing recess 62 for accommodating a pilot 64 within which the end of a central shaft 66 is journalled.

Figure 17:
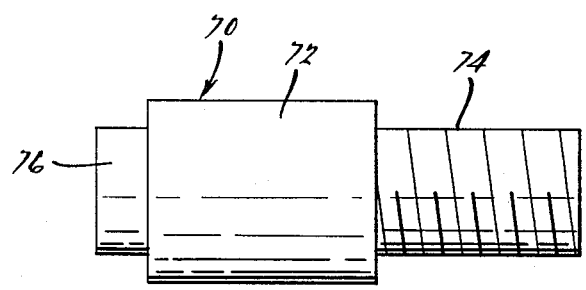
FIG. 17 shows a spacer pin used to secure the case elements or housing for the damper of FIG. 1.

A cover 68 or retainer plate is disposed in facing juxtaposed relationship with respect to the cover portion 58. It is secured to the cover portion 58 by spacers 70 which are shown particularly in FIG. 17. The spacers of FIG. 17 include a central portion 72, a threaded portion 74 and an extension 76, the latter being received through openings 78 in the retainer plate 68 and welded as shown in FIG. 1. There are three such spacers at locations, spaced 120 degrees apart as indicated in FIG. 2.

Figure 11:
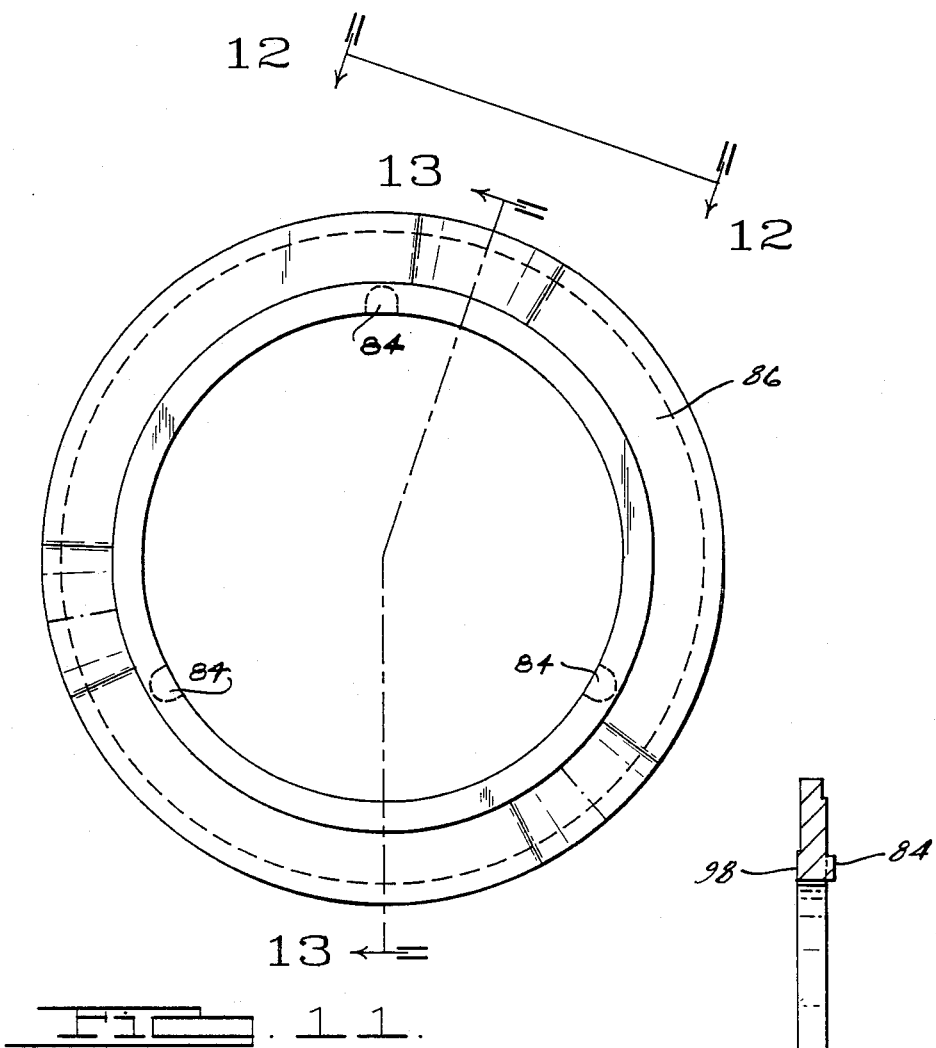
FIG. 11 shows another cam element that cooperates with the cam element of FIG. 8.
Figure 13:
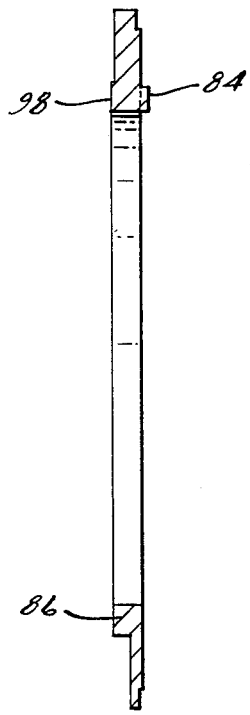
FIG. 13 is a cross-sectional view as seen from the plane of section line 13—13 of FIG. 11.

The threaded portions 74 of the spacers 70 are threadably received in the threaded openings formed in the cover portion 58. The internally threaded portion of the cover 58 carries drive tangs 80. Those tangs are received in the outer margin of a annular Belleville spring 82. The inner margin of the Bellevelle spring 82 is recessed to receive a driving tang 84 formed on the inner margin of an annular cam plate, which is best seen in FIGS. 11 and 13, thus providing a driving connection between the cover 16 and the cam plate, the latter being designated by reference character 86.

Cam plate 86 is formed with a pilot shoulder 88 on which is received a friction cam plate 90. The cam plate 90 is shown particularly in FIGS. 8, 9 and 10.

The face of the cam plate 90 that is situated directly adjacent the cam surface of cam element 86 is provided with cam surfaces 92, which form a transition in a relatively thin cam plate portion 94 and a thicker cam plate portion 96.

Figure 12:
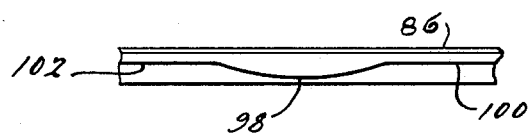
FIG. 12 is an edge view of the cam element of FIG. 11 as seen from the plane of section line 12—12 of FIG. 11.

Referring next to FIG. 12, it is seen that the cam element 86 is provided with a cam follower portion 98 situated between two planer surfaces 100 and 102. Thus when the cam plate 90 with its follower 98 is displaced rotatably relative to the cam element 86, the cam plate 90 is moved axially relative to the converter cover 16. The outer periphery of the cam plate 90 is provided with recessed projections 104 as best seen in FIG. 8. These projections register with an axially offset drive tangs 106 formed on the inner periphery of driven damper plate 108.

As seen in FIGS. 6 and 7, the driven damper plate is provided with extensions 110 located 120 degrees apart. These extensions provide spring seats for compression spring 112, best seen in FIG. 1, which extend through the 120 degree arc between two extensions 110.

The arcuate space defined by two extensions 110 as seen in FIG. 6 is occupied by a spring 112. There is a separate spring 112 for each 120 degree actuate space. One end of each spring is seated on an extension 110 and the opposite end is seated on the companion extension 110. Located within each spring 112 is a circular guide 114 which is shown in detail in FIGS. 14 and 15. The guide positions the springs and maintains them in an assembled condition as the springs are loosely fitted over it. The springs have a large length to diameter ratio of 4 or greater. We prefer a length to diameter ratio of at least 8.

The guide 114 as seen in FIGS. 14 and 15 is formed of tubular stock, the outside diameter of which is slightly less than the inside diameter of the springs. The guide is recessed at 120 degree intervals as shown at 116 in FIG. 14A as well as in FIG. 14. The radial extensins 110 of the driven plate 108 extend through the recesses 116 as indicated in FIG. 1. The spring retainer plate 68 includes extensions 118 located at 120 degree intervals as seen in FIGS. 4 and 5. Each edge of the extensions 118 can be upset to form tabs 120 and 122 which extend perpendicularly with respect to the plane of the plate 68. These tabs provide an anchor seat for the springs 110 together with the abutment 58 as shown in FIG. 3.

Figure 16:
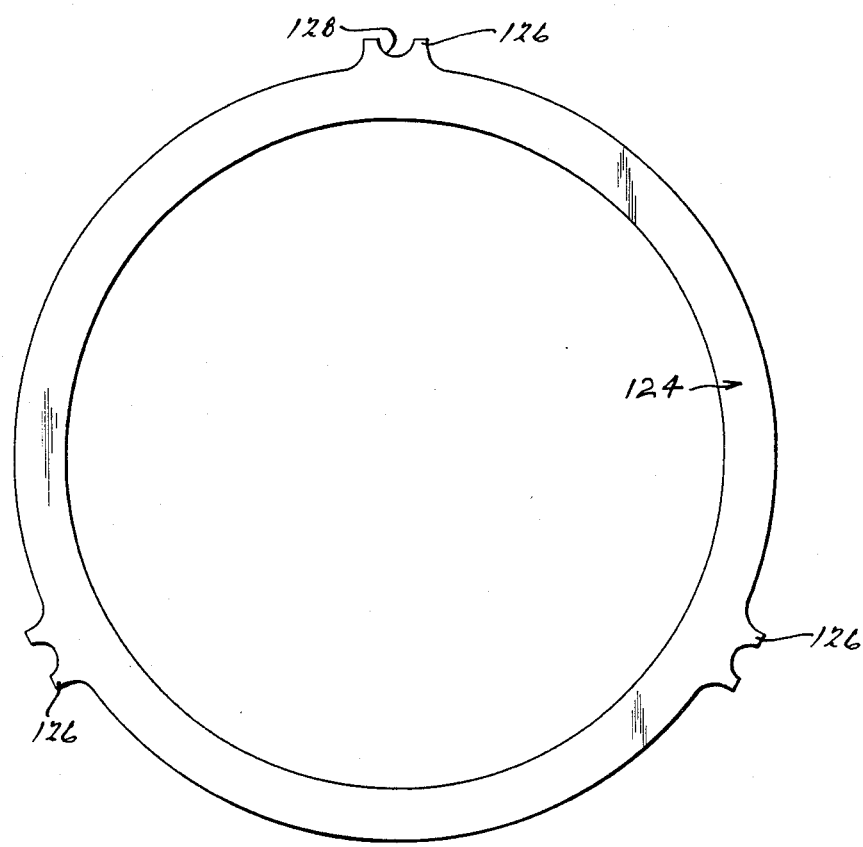
FIG. 16 is a plan view of a friction disc which is used in the assembly of FIG. 1 to obtain a friction lag.

In FIG. 1 a friction plate is identified by reference character 124. It is shown in detail in FIG. 16. It comprises a flat annular friction disc with driving tangs 126 located on its periphery at 120 degree intervals. The tangs are provided with recesses 128 which register with and are drivably connected to spacer pin 70. Thus the plate 124 rotates in unison with the retainer plate 68 and the cover 16, both of which are secured together in a fixed assembly by the pins 70.

As seen in FIG. 1, friction material is provided on opposite sides of the friction disc 124 as indicated at 126 and 128. Friction material also can be provided on the retainer plate 68 as indicated in FIG. 1 at 130.

The opposite sides of the annular driven plate 108 form friction surfaces. The flat surface 132 of the cam plate 96 shown in FIGS. 8 and 10, as well as in FIG. 1, also provides a friction surface engaged by the friction material 128.

When torque is distributed from the damper housing 16 to the ring gear 40, a torque transfer occurs through the springs which exert a spring force on the driven plate 108. Thus the driven plate tends to rotate relative to the cover 16 as the springs are compressed. That causes a sliding friction torque to be established by the friction surfaces of the driven plate, the cam plate 96 and the retainer plate 68. Friction torque is established because of the axial force distributed to the cam plate 86 by the Belleville spring 82, which is anchored as explained previously on the cover plate 16. The Belleville spring 82 is driven by the cover plate 16 because of the driving connection shown at 80. This causes the cam plate 86 to be driven and imposes an axial force on the cam follower plate 90, which increases the friction force of the engaged friction surfaces. The magnitude of that force, of course, depends on the relative angular displacement of the cam plates 86 and 90, which in turn is proportional to the spring deflection. It, therefore, is proportional to the magnitude of the torque being delivered to the damper. A larger torque distributed through the damper will cause a larger cam force component, thus increasing the friction lag in the system.

The invention comprises a variable friction lag system that enables a smooth transition from a moderate lag used in high frequency torsional isolation stages to a much higher lag required to absorb the energy of transferring major torque fluctuations in an automotive driveline. As relative angular motion is created between the damper cover plate and the driven damper plate, the variable friction lag feature produces an axial displacement that compresses the Belleville spring 82. The Belleville spring thus produces an axial force component that engages the friction surfaces.

Although the embodiment described in this disclosure includes a Belleville spring, we contemplate that a circular wave spring could be used as well.

Actual damping characteristics and the variable lag can be tailored to suit any design requirement by appropriately designing the geometry of the cam surfaces of the cam plates shown in FIG. 11 and in FIGS. 8, 9 and 10. The amount of the lag thus can be varied so that it changes in proportion to the displacement. The torque may be transmitted by the damper with a linear characteristic or a nonlinear characteristic depending on the cam contour that is chosen.

Figure 18:
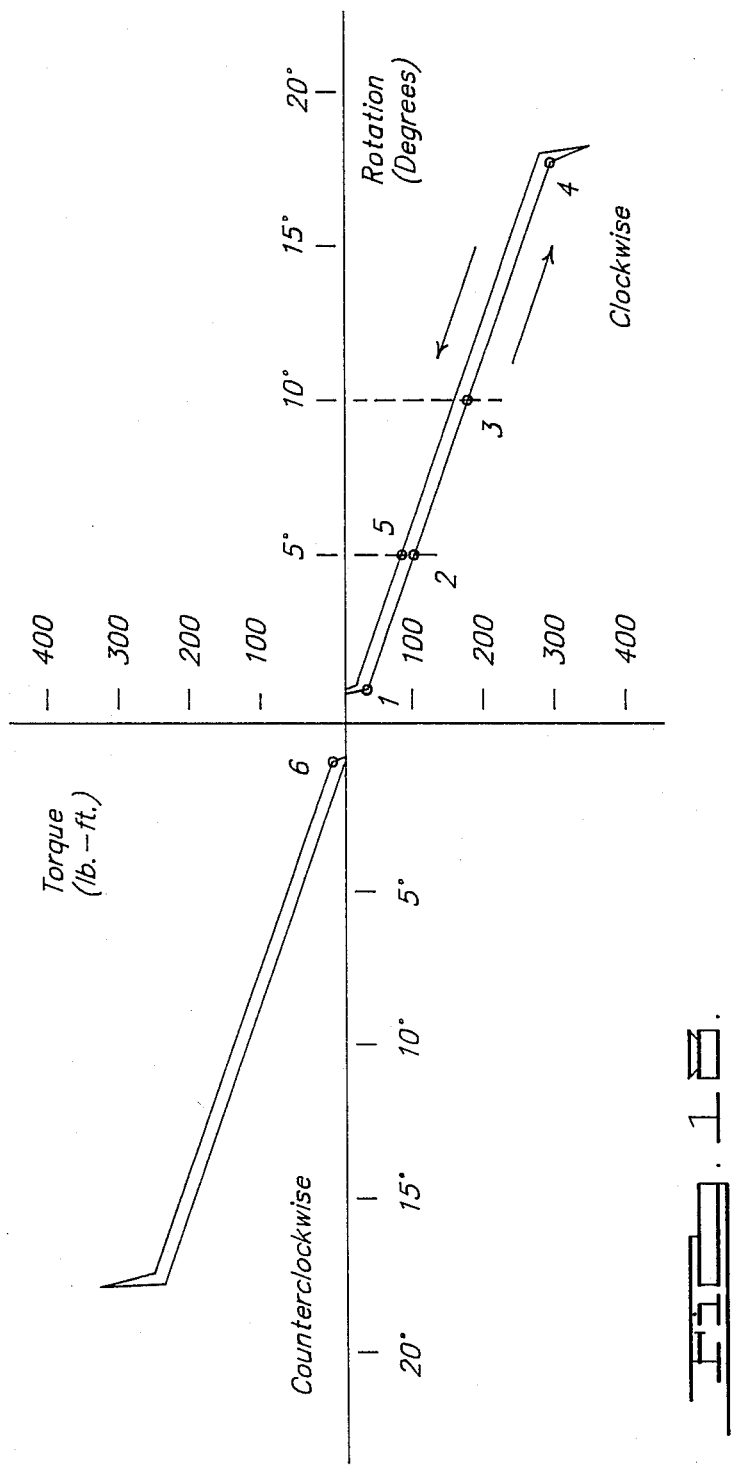
FIG. 18 is a plot that shows the relationship between rotation of the rotary elements of the damper of FIG. 1 and the torque transmitted by the damper.

The variable friction lag and the spring assembly cooperate to establish a hysteresis effect which is illustrated in FIG. 18 where we have plotted angular relative rotation of the cover plate and the driven plate on the horizontal abscissa and torque transmitted on the vertical ordinate axis. The space between the origin of the plot of FIG. 18 and point 1 represents a backlash in the damper system during relative deflection in one direction. The torque transmitted varies with angular rotation in accordance with the straight line plot for points 1, 2, 3 and 4. At point 4 the spring becomes fully compressed. Unless a torque reversal occurs at that instant, a spike or an instantaneous rise in the torque transmitted occurs, as represented by the sharp break in the plot. As the torque is relieved upon relative deflection of the damper assembly in the opposite direction with the spring assisting relative rotation rather than opposing relative rotation, the relationship appears as the straight line that contains point 5. The area between the line containing points 1, 2, 3 and 4 and the line containing point 5 is a so-called hysteresis area. As the torque is reversed beyond the origin, the characteristic shape of the clockwise quadrant is repeated in the opposite quadrant of the chart of FIG. 18, which represents counterclockwise relative rotation.

Figure 19:
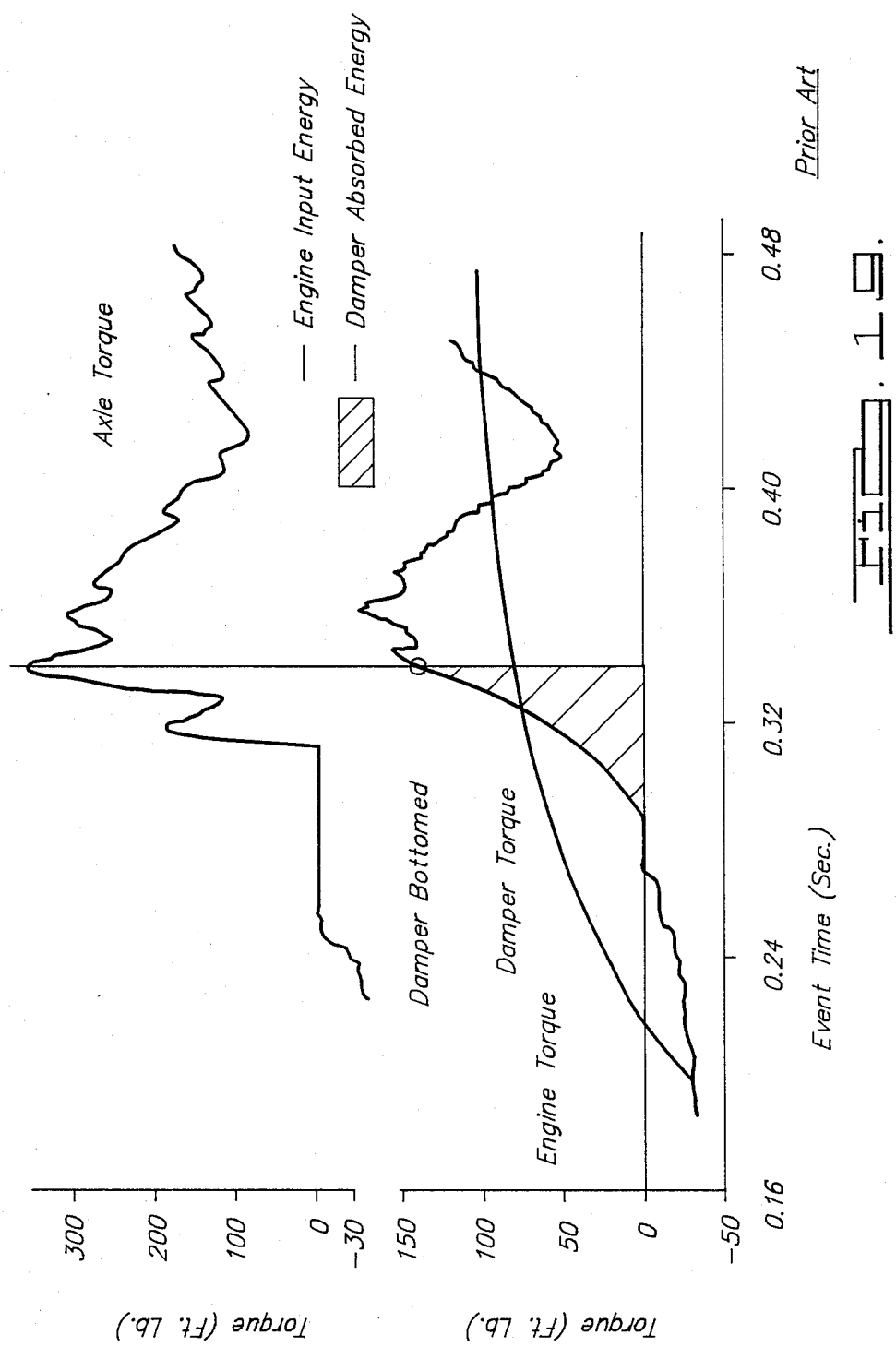
FIG. 19 is a graph that shows the absorbed energy and the damper torque for a prior art damper design.
Figure 20:
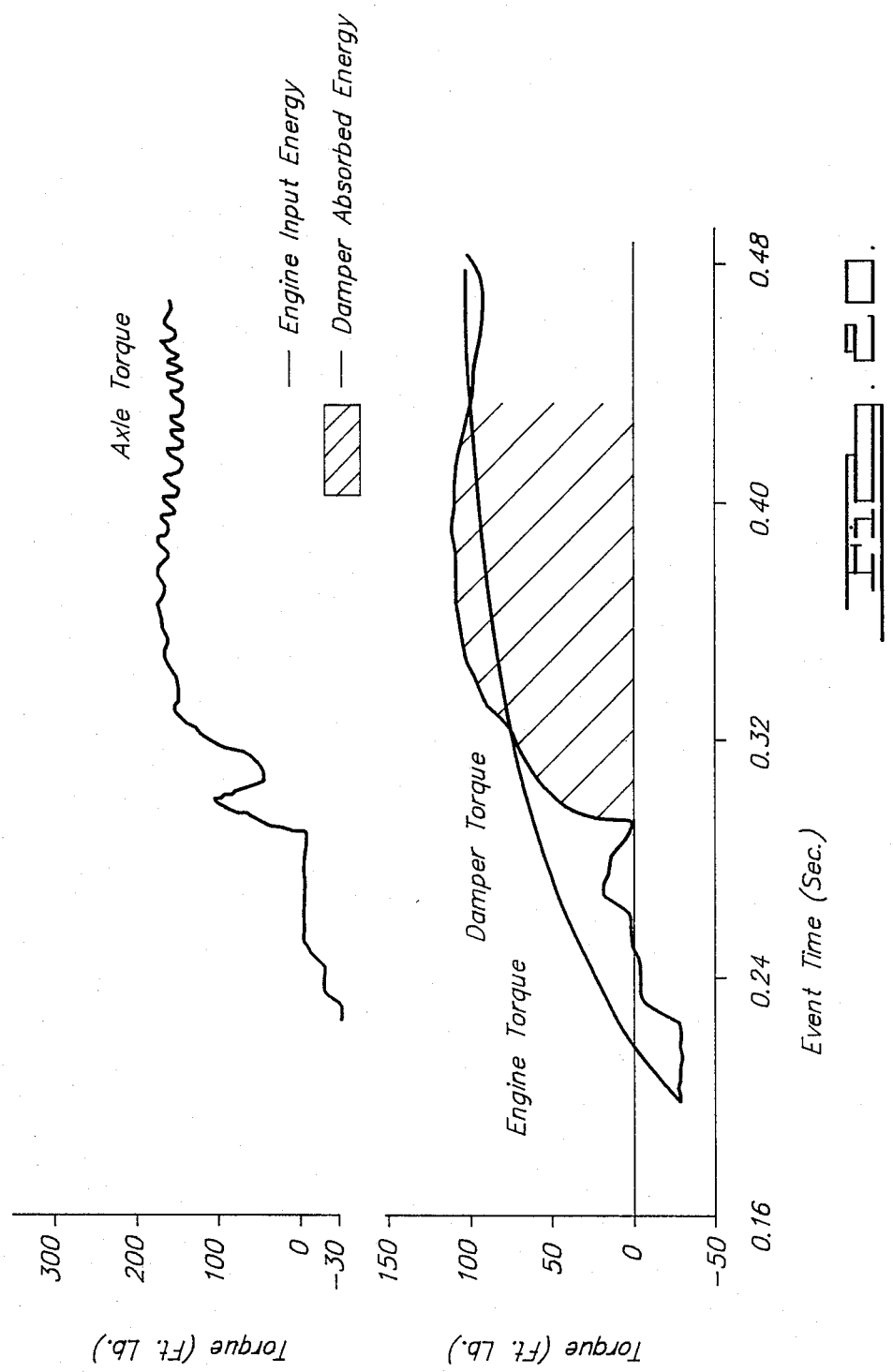
FIG. 20 is a graph showing the damper absorbed energy and the torque delivered by the damper of the damper of this invention.

Referring next to FIGS. 19 and 20, we have shown the difference in the dynamic response for a prior art damper design in comparison to our improved damper design. FIG. 19 shows a prior art damper response characteristic and FIG. 20 shows the improved damper characteristic of our invention.

In FIG. 19 the engine torque and the torque delivered through the damper are plotted. Because of torque fluctuations, the damper torque exceeds the engine torque at a midpoint on the horizontal time plot. If that damper torque is extreme, the damper will bottom out as indicated by the legend at the midpoint of the chart. This produces a sharp peak in the axle torque which is plotted separately on the same chart above the plot for the engine torque and the damper torque. This peak is followed by a series of peaks until stability is achieved at late point on the time plot on the horizontal axis. That point occurs long after the inception of the torque fluctuation.

The improved characteristic shown in FIG. 20 will result in a damper torque that more closely follows engine torque with minimal peaks and valleys. This is due to the variable friction lag introduced by the damper Belleville spring and the calibrated cam discs. Those discs together provide a friction engaging force for the friction elements of the damper assembly that is proportional to relative displacement of the input torque portions of the damper and the output torque portions. The resulting axle torque that is produced by our improved damper assembly is plotted in FIG. 20 above the plot for the engine torque and the damper torque. It should be noted that the torque fluctuations are very minor in comparison to the plot of FIG. 19.

In the prior art damper having the characteristics of FIG. 19 there must be a compromise between the power train transient torque capacity and the steady state isolation requirements. Such a compromise is not needed in our improved design because the variable friction lag torque satisfies the power train transient torque fluctuations as well as the steady state modes. Our improved design also improves the calibration flexibility since the damper cam plates can be modified to suit any design requirement.

The characteristic curves of FIGS. 19 and 20 actually were developed for a damper used with a lockup torque converter rather than with a split torque transmission of the kind shown in FIG. 1. The characteristics shown in FIGS. 19 and 20 will be appropriate for a split torque gear system of the kind shown in FIG. 1 as well as for the lockup converter damper of FIG. 21.

Figure 21:
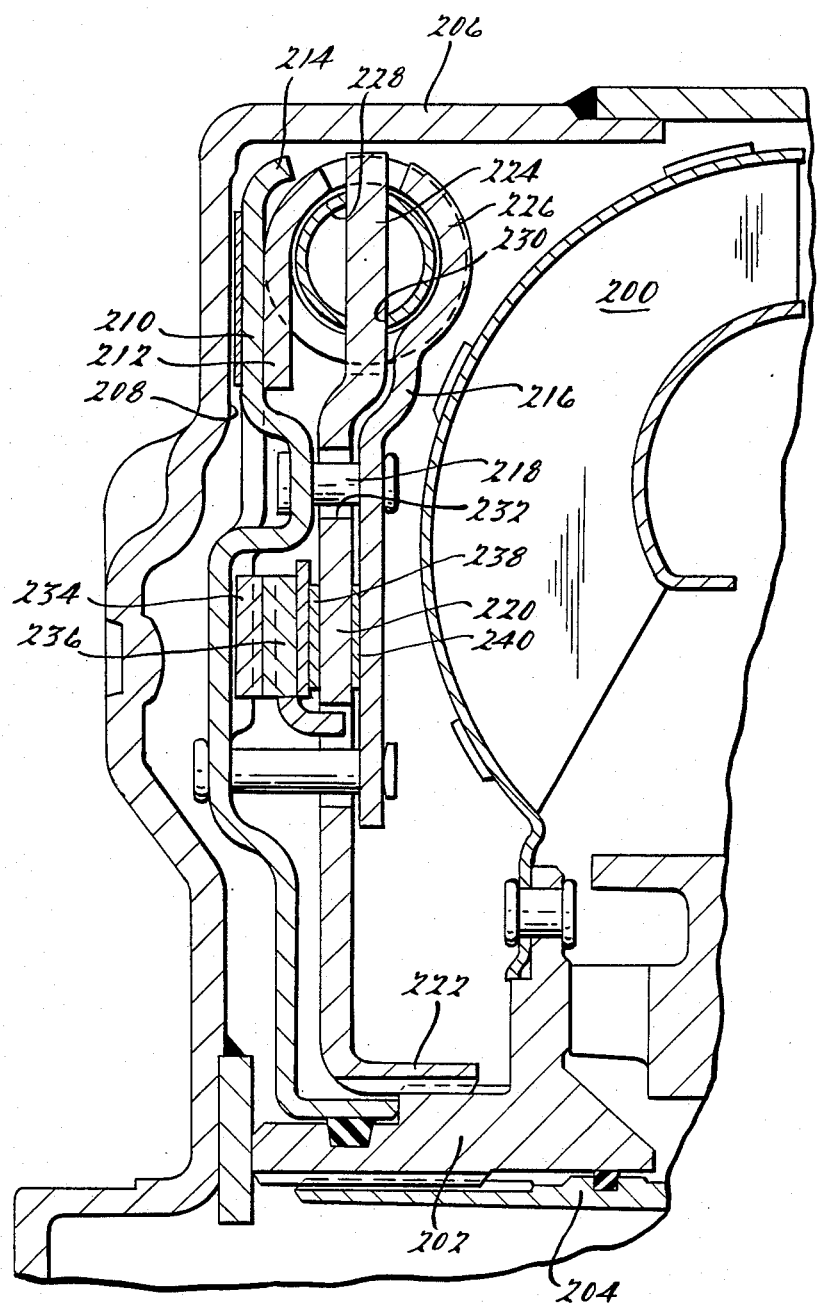
FIG. 21 is a cross-sectional view of a modified damper assembly incorporating our invention. It is shown in a lockup torque converter.

In FIG. 21 numeral 200 designates the turbine of a hydrokinetic torque converter. It includes a hub 202 which is splined to a torque input shaft 204 for a gear system, not shown. The converter includes an impeller, only partially shown in FIG. 1. The impeller comprises an impeller housing 206 having an internal annular surface 208 that defines a clutch friction surface. A friction plate 210 is situated directly adjacent the surface 208. It carries spring seats 212 against which damper springs 214 are seated. The plate 210 is secured to damper cover plate 216 by spacer pins 218. A driven damper plate 220 extends radially inward and is splined at its hub 222 to the turbine hub 202.

Driven plate 220 has extensions 224 situated between the ends of the adjacent springs which are situated 180° apart. These springs are adapted to be seated on anchor portions 226 of the cover plate 216.

A circular spring guide 228 encircles the axis of the damper and the springs are trained over it with a liberal clearance between spring inside diameter and the outside diameter of the guide. The extensions 224 extend through slotted openings 230 in the guide.

The spacer pins 218 are received in circumferential openings 232 in the driven plate 220 thereby permitting relative displacement of the cover plate 216 with respect to the driven plate 220.

A pair of cam plates shown in FIG. 21 at 234 and 236, is secured to the clutch plate 210 and to the driven plate 220, respectively. These include registering cam surfaces such as those described with reference to FIGS. 11, 12 and 13 and FIGS. 8, 9 and 10. As relative displacement occurs between the driven plate and the clutch plate, the cam plates will create an axial force that establishes log torque on friction rings 238 and 240 carried by the driven plate 220.

Having described preferred embodiments of our invention, what we claim and desire to secure by U.S. Letters Patent is:

1. A damper assembly for a power transmission mechanism comprising a cover plate adapted to be connected drivably to a driving engine and a driven plate adapted to be connected to a torque input element of transmission gearing, said damper assembly including further:
    a plurality of springs spaced angularly about the axis of said damper assembly between said cover plate and said driven plate, said springs having a length to diameter ratio greater than four;
    a spring guide comprising a circular member with a cross-sectional dimension less than the inside diameter of said springs, said springs being disposed about said guide and supported by it;
    a first cam plate connected to said cover plate and a second cam follower plate connected to said driven plate, said cam plates having registering cam surfaces whereby relative angular displacement of said cover plate and said driven plate create an axial displacement of said cam plates, one with respect to the other; and
    a friction lag clutch having friction surfaces adjacent said cam plates and carried by said cover plate and said driven plate whereby a variable friction lag torque is established upon the occurrence of torque fluctuations as torque is transmitted between said engine and said transmission gearing.

2. A damper assembly for a power transmission mechanism comprising a cover plate adapted to be connected drivably to a driving engine and a driven plate adapted to be connected to a torque input element of transmission gearing, said damper assembly including further:
    a plurality of springs spaced angularly about the axis of said damper assembly between said cover plate and said driven plate, said springs having a length to diameter ratio greater than four;
    a spring guide comprising a circular member with a cross-sectional dimension less than the inside diameter of said springs, said springs being disposed about said guide and supported by it;
    a first cam plate connected to said cover plate and a second cam follower plate connected to said driven plate, said cam plates having registering cam surfaces whereby relative angular displacement of said cover plate and said driven plate create an axial displacement of said cam plates, one with respect to the other;
    a friction lag clutch having friction surfaces adjacent said cam plates and carried by said cover plate and said driven plate whereby a variable friction lag torque is established upon the occurrence of torque fluctuations as torque is transmitted between said engine and said transmission gearing; and
    a spring member disposed between one of said cover plate damper plates and one of said cam plates whereby said spring member normally distributes a friction lag clutch engaging force thus establishing a threshold friction lag, the effective friction lag increasing beyond said threshold lag upon an increase in the angular relative displacement of said driven plate and said cover plate.

3. A damper assembly for a power transmission mechanism comprising a cover plate adapted to be connected drivably to a driving engine and a driven plate adapted to be connected to a torque input element of transmission gearing, said damper assembly including further:
    a plurality of springs spaced angularly about the axis of said damper assembly between said cover plate and said driven plate, said springs having a length to diameter ratio greater than four;
    a spring guide comprising a circular member with a cross-sectional dimension less than the inside diameter of said springs, said springs being disposed about said guide and supported by it;
    a first cam plate connected to said cover plate and a second cam follower plate connected to said driven plate, said cam plates having registering cam surfaces whereby relative angular displacement of said cover plate and said driven plate create an axial displacement of said cam plates, one with respect to the other;

a friction lag clutch having friction surfaces adjacent said cam plates and carried by said cover plate and said driven plate whereby a variable friction lag torque is established upon the occurrence of torque fluctuations as torque is transmitted between said engine and said transmission gearing; and a spring member disposed between one of said cover plate damper plates and one of said cam plates whereby said spring member normally distributes a friction lag clutch engaging force thus establishing a threshold friction lag, the effective friction lag increasing beyond said threshold lag upon an increase in the angular relative displacement of said driven plate and said cover plate; and said spring being a Belleville spring having one margin connected to one of said cam plates and the other margin connected to said cover plate whereby torque is transmitted through said Belleville spring between said one cam plate and said cover plate.

4. The combination as set forth in claim 1 wherein said transmission mechanism comprises a hydrokinetic torque converter with a lockup clutch which, when engaged, establishes a bypass torque delivery path around the converter, said lockup clutch having a piston friction plate adjacent a torque input element of said converter, said piston friction plate being connected to said damper assembly cover plate, said damper assembly driven plate being connected to a torque output element of said converter.

5. The combination as set forth in claim 2 wherein said transmission mechanism comprises a hydrokinetic torque converter with a lockup clutch which, when engaged, establishes a bypass torque delivery path around the converter, said lockup clutch having a piston friction plate adjacent a torque input element of said converter, said piston friction plate being connected to said damper assembly cover plate, said damper assembly driven plate being connected to a torque output element of said converter.

* * * * *